US011649386B2

(12) United States Patent
Xie et al.

(10) Patent No.: US 11,649,386 B2
(45) Date of Patent: May 16, 2023

(54) TWO-COMPONENT ADHESIVE COMPOSITIONS BASED ON PHOSPHATE ESTER MODIFIED ISOCYANATES, AND METHODS FOR MAKING SAME

(71) Applicant: Dow Global Technologies LLC, Midland, MI (US)

(72) Inventors: Rui Xie, Pearland, TX (US); Jie Wu, Lake Jackson, TX (US); Tuoqi Li, Dallas, TX (US); Kristy Brown, Pearland, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 17/042,796

(22) PCT Filed: Jan. 28, 2019

(86) PCT No.: PCT/US2019/015325
§ 371 (c)(1),
(2) Date: Sep. 28, 2020

(87) PCT Pub. No.: WO2019/190622
PCT Pub. Date: Oct. 3, 2019

(65) Prior Publication Data

US 2021/0024794 A1 Jan. 28, 2021

Related U.S. Application Data

(60) Provisional application No. 62/649,122, filed on Mar. 28, 2018.

(51) Int. Cl.

| | |
|---|---|
| ***C09J 175/04*** | (2006.01) |
| ***B32B 7/12*** | (2006.01) |
| ***B32B 27/32*** | (2006.01) |
| ***B32B 37/12*** | (2006.01) |
| ***B32B 15/08*** | (2006.01) |

(Continued)

(52) U.S. Cl.
CPC ............ *C09J 175/04* (2013.01); *B32B 5/022* (2013.01); *B32B 5/024* (2013.01); *B32B 5/26* (2013.01); *B32B 7/12* (2013.01); *B32B 15/08* (2013.01); *B32B 15/12* (2013.01); *B32B 15/14* (2013.01); *B32B 27/08* (2013.01); *B32B 27/10* (2013.01); *B32B 27/12* (2013.01); *B32B 27/32* (2013.01); *B32B 29/002* (2013.01); *B32B 29/02* (2013.01); *B32B 37/12* (2013.01); *C08G 18/12* (2013.01); *C08G 18/3206* (2013.01); *C08G 18/4018* (2013.01); *C08G 18/42* (2013.01); *C08G 18/4208* (2013.01); *C08G 18/4804* (2013.01); *C08G 18/4825* (2013.01); *C08G 18/5084* (2013.01); *C08G 18/7671* (2013.01); *C08G 18/797* (2013.01); *B32B 2037/1269* (2013.01); *B32B 2255/10* (2013.01); *B32B 2255/205* (2013.01); *B32B 2307/748* (2013.01); *B32B 2307/75* (2013.01); *B32B 2439/70* (2013.01);

(Continued)

(58) Field of Classification Search
CPC .......... C09J 175/04; B32B 7/12; B32B 27/32; B32B 37/12; B32B 2037/1269; B32B 2439/70; B32B 2255/10; B32B 2307/75; B32B 2439/80; B32B 5/022; B32B 5/024; B32B 5/26; B32B 2255/205; B32B 2307/748; B32B 15/08; B32B 15/12; B32B 15/14; B32B 27/08; B32B 27/10; B32B 27/12; B32B 29/002; B32B 29/02; C08G 18/3885; C08G 18/7671; C08G 18/12; C08G 18/3206; C08G 18/4018; C08G 18/42; C08G 18/4208; C08G 18/4804; C08G 18/4825; C08G 18/5084; C08G 18/797
See application file for complete search history.

(56) References Cited

U.S. PATENT DOCUMENTS

2017/0226391 A1* 8/2017 Vietti ..................... B32B 27/08

FOREIGN PATENT DOCUMENTS

EP 0084364 A1 7/1983
EP 2072249 A1 6/2009

(Continued)

OTHER PUBLICATIONS

PCT/US2019/015325, Search Report and Written Opinion dated Apr. 8, 2019.

(Continued)

*Primary Examiner* — Rabon A Sergent

(57) ABSTRACT

The disclosed adhesive compositions comprise (A) an isocyanate component comprising an isocyanate-terminated prepolymer that is the reaction product of a polyisocyanate and an isocyanate-reactive mixture comprising a phosphate ester polyol. The disclosed adhesive compositions further comprise (B) an isocyanate-reactive component polyol component comprising a polyol. In some embodiments, methods for preparing two-component adhesives formulations are disclosed comprising preparing an isocyanate component comprising an isocyanate-terminated prepolymer by reacting a polyisocyanate with an isocyanate-reactive mixture comprising a phosphate ester polyol and preparing an isocyanate-reactive component comprising a polyol. The methods further comprise mixing the isocyanate component and the isocyanate-reactive component at a stoichiometric ratio (NCO/OH) of from about 1.0 to about 5.0. Methods for forming laminate structures, and the laminate structures themselves, are also disclosed.

7 Claims, No Drawings

(51) Int. Cl.

| | |
|---|---|
| ***B32B 27/10*** | (2006.01) |
| ***B32B 29/02*** | (2006.01) |
| ***C08G 18/48*** | (2006.01) |
| ***C08G 18/50*** | (2006.01) |
| ***B32B 5/02*** | (2006.01) |
| ***C08G 18/76*** | (2006.01) |
| ***B32B 27/12*** | (2006.01) |
| ***B32B 5/26*** | (2006.01) |
| ***C08G 18/42*** | (2006.01) |
| ***C08G 18/32*** | (2006.01) |
| ***B32B 29/00*** | (2006.01) |
| ***B32B 15/14*** | (2006.01) |
| ***B32B 15/12*** | (2006.01) |
| ***C08G 18/40*** | (2006.01) |
| ***B32B 27/08*** | (2006.01) |
| ***C08G 18/79*** | (2006.01) |
| ***C08G 18/12*** | (2006.01) |
| *C08G 18/38* | (2006.01) |

(52) U.S. Cl.
CPC ...... *B32B 2439/80* (2013.01); *C08G 18/3885* (2013.01)

(56) References Cited

FOREIGN PATENT DOCUMENTS

| | | | |
|---|---|---|---|
| FR | 2233379 | A2 | 1/1975 |
| JP | H11263906 | A | 9/1999 |
| WO | 2015/168670 | A1 | 11/2015 |
| WO | 2018/013220 | A1 | 1/2018 |
| WO | 2018/013221 | A1 | 1/2018 |
| WO | 2018/013223 | A1 | 1/2018 |

OTHER PUBLICATIONS

PCT/US2019/015325, International Preliminary Report of Patentability dated Sep. 29, 2020.

J. Pretula et al., Journal of Polymer Science, Part A: Polymer Chemistry, 2008, pp. 830-843, vol. 46.

* cited by examiner

TWO-COMPONENT ADHESIVE COMPOSITIONS BASED ON PHOSPHATE ESTER MODIFIED ISOCYANATES, AND METHODS FOR MAKING SAME

FIELD OF THE DISCLOSURE

The instant disclosure relates to two-component adhesive compositions. The adhesive compositions comprise (A) an isocyanate component and (B) an isocyanate-reactive component, where the isocyanate component (A) is based on a phosphate ester polyol. The adhesive compositions are suitable for use with traditional laminating techniques (i.e., pre-mixing the two components before application to a substrate) and with relatively-newer laminating techniques (i.e., higher-reactivity systems in which each component is applied to a separate substrate before bringing the substrates together to mix the components). Further, the adhesive compositions can be solventless or solvent-based. The disclosed adhesive compositions show improved bond strength, temperature resistance, and chemical resistance, while maintaining extended potlife, and are useful for food packaging, pharmaceutical packaging, and industrial laminations.

BACKGROUND AND SUMMARY OF THE DISCLOSURE

Adhesive compositions are useful for a wide variety of purposes. For instance, adhesive compositions are used to bond together substrates such as polyethylene, polypropylene, polyester, polyamide, metal, metallized, paper, or cellophane to form composite films, i.e., laminates. These types of adhesives are commonly referred to as "laminating adhesives."

One particular variety of laminating adhesives includes two-component polyurethane-based adhesives. Typically, a two-component polyurethane-based laminating adhesive includes an isocyanate component comprising an isocyanate-containing prepolymer and/or a polyisocyanate and an isocyanate-reactive component comprising a polyol. The prepolymer can be obtained by the reaction of excess isocyanate with a polyether and/or polyester containing two or more hydroxyl groups per molecule. The isocyanate-reactive component comprises a polyether and/or polyester initiated with two or more hydroxyl groups per molecule. The two components are typically combined in a predetermined ratio, or "premixed," and then applied on a surface of a first substrate ("carrier web"). The surface of the first substrate is then brought together with a surface of a second substrate to form a laminate structure. More recently, faster curing two-component systems have been developed in which each component is applied individually to a surface of a substrate. The surfaces of each substrate are then brought together so that the two components mix, thereby forming the laminate structure. Additional layers of substrate can be added to the laminate structure with additional layers of adhesive composition located between each successive substrate. The adhesive is then cured, either at room temperature or elevated temperature, thereby bonding the substrates together.

Such laminating adhesives are widely can be used in the manufacture of film/film and film/foil laminates used in the packaging industry, especially for food packaging, pharmaceutical packaging, and industrial laminations, where exposure to aggressive chemicals at elevated temperatures is typical. To improve temperature and chemical resistance of the adhesives, adhesion promoters, such as silane coupling agents, titanate coupling agents, aluminate coupling agents, as well as epoxy resins, phosphoric acid, and phosphate esters are sometimes used. These adhesion promoters each have strengths and weaknesses.

Recently, phosphate ester polyols have been used in laminating adhesive compositions to improve temperature and chemical resistance, especially in metal laminate structures, such as laminate structures based on foil and metalized films. The phosphate ester polyols are typically incorporated in the isocyanate-reactive component at less than 15% by weight of the isocyanate-reactive component. However, the addition of phosphate ester polyols speeds up the reaction between the isocyanate component and the isocyanate-reactive component, therefore shortening the potlife. Shortened potlife can affect quality and consistency of the laminates, and creates potential difficulties in maintenance and cleaning. As a result, adhesives with extended potlife, usually greater than 40 minutes, are more advantageous.

Thus, two-component laminating adhesives exhibiting improved temperature and chemical resistance, while maintaining extended potlife, are desirable.

Accordingly, such two-component laminating adhesive compositions, and methods for making same, are disclosed. The disclosed adhesive compositions are suitable for use with traditional laminating techniques (i.e., pre-mixing) and with relatively-newer laminating techniques (i.e., higher reactivity systems). Further, the adhesive compositions can be solventless or solvent-based.

In some embodiments, the disclosed adhesive compositions comprise (A) an isocyanate component comprising an isocyanate-terminated prepolymer that is the reaction product of a polyisocyanate and an isocyanate-reactive mixture comprising a phosphate ester polyol. The disclosed adhesive compositions further comprise (B) an isocyanate-reactive component polyol component comprising a polyol.

In some embodiments, methods for preparing two-component adhesives formulations are disclosed. In some embodiments, the methods comprise preparing an isocyanate component comprising an isocyanate-terminated prepolymer by reacting a polyisocyanate with a mixture comprising a phosphate ester polyol and preparing an isocyanate-reactive component comprising a polyol. The methods further comprise mixing the isocyanate component and the isocyanate-reactive component at a stoichiometric ratio (NCO/OH) of from about 1.0 to about 5.0.

In some embodiments, methods for forming a laminate structure are disclosed. In some embodiments, the methods comprise mixing an isocyanate component and an isocyanate-reactive component at a stoichiometric ratio (NCO/OH) of from about 1.0 to about 5.0 to form a two-component adhesive composition, the isocyanate component comprising an isocyanate terminated prepolymer that is the reaction product of a polyisocyanate and an isocyanate-reactive mixture comprising a phosphate ester polyol. The methods further comprise applying the adhesive composition to a surface of a first substrate, bringing the surface of the first substrate into contact with a surface of a second substrate, and curing the adhesive composition to bond the first substrate to the second substrate. In other embodiments, the methods comprise uniformly applying an isocyanate component to a surface of a first substrate, the isocyanate component comprising an isocyanate terminated prepolymer that is the reaction product of a polyisocyanate and an isocyanate-reactive mixture comprising a phosphate ester polyol, uniformly applying an isocyanate-reactive component to a surface of a second substrate, bringing the first substrate and second substrate together, thereby mixing and reacting the isocyanate component and the polyol component to form an adhesive composition between the first substrate and the second substrate, and curing the adhesive composition to bond the first substrate and the second substrate.

Additional optional components in the two-component adhesive compositions include, but are not limited to, a surfactant, a leveling agent, a defoamer, a rheology modifier, a color pigment, an adhesion promoter (e.g., phosphate esters and epoxies), and the like, and any combination thereof.

Further, a solvent, such as ethyl acetate, methyl ethyl ketone, toluene, and a combination thereof, can be incorporated in the disclosed two-component adhesive compositions to form solvent-based adhesives.

Laminate structures comprising the disclosed two-component adhesive compositions are also disclosed herein.

DETAILED DESCRIPTION OF THE DISCLOSURE

The two-component adhesive compositions according to this disclosure comprise an isocyanate component and an isocyanate-reactive component, as discussed above.

(A) Isocyanate Component

In some embodiments, the isocyanate component comprises an isocyanate-terminated prepolymer. In some embodiments, the isocyanate-terminated prepolymer is the reaction product of a polyisocyanate and an isocyanate-reactive mixture comprising a phosphate ester polyol.

In some embodiments, the isocyanate component comprises an isocyanate-terminated prepolymer and an isocyanate selected from the group consisting of an aromatic isocyanate, an aliphatic isocyanate, a cycloaliphatic isocyanate, and combinations thereof.

Suitable aromatic isocyanates include, but not limited to, 1,3- and 1,4-phenylene diisocyanate, 1,5-naphthylene diisocyanate, 2,6-tolulene diisocyanate, 2,4-tolulene diisocyanate (2,4-TDI), 2,4'-diphenylmethane diisocyanate (2,4'-MDI), 4,4'-diphenylmethane diisocyanate, polymeric isocyanates, and combinations thereof.

Suitable aliphatic polyisocyanates advantageously have 3 to 16 carbon atoms, preferably 4 to 12 carbon atoms, in the linear or branched alkylene residue and suitable cycloaliphatic or cycloaliphatic diisocyanates advantageously have 4 to 18 carbon atoms, preferably 6 to 15 carbon atoms, in the cycloalkylene residue. Those skilled in the art adequately understand cycloaliphatic diisocyanates simultaneously to mean cyclically and aliphatically bound NCO groups, such as isophorone diisocyanate. In contrast to this, cycloaliphatic diisocyanates are understood to mean those which only have NCO groups directly bound to the cycloaliphatic ring, e.g., $H_{12}$MDI.

Suitable aliphatic and cycloaliphatic isocyanates include cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate, isophorone diisocyanate (IPDI), hexamethylene diisocyanate (HDI), diisocyanatodicyclohexylmethane (H12MDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), xylylene diisocyanate (XDI), tetramethylxylylene diisocyanate, and dimers, trimers, and combinations thereof.

Additional isocyanates, such as 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropylcyclohexyl isocyanate, 2,4'-methylenebis(cyclohexyl) diisocyanate, and 1,4-diisocyanato-4-methyl-pentane are also suitable for use according to this disclosure.

Phosphate ester polyols for use in the production of the isocyanate-terminated prepolymer can be made via reaction of hydroxyl-terminated compounds and phosphoric acid or polyphosphoric acid. Suitable hydroxyl-terminated compounds include polyester polyols, polycaprolactone polyols, polyether polyols, polycarbonates polyols, natural oil based polyols, and mixtures and copolymers of them. The average OH number for the hydroxyl-terminated compounds can be from 5 to 2,000 mg KOH/gram, or from 14 to 850 mg KOH/gram, or from 56 to 500 mg KOH/gram, or from 110 to 450. The average functionality of the hydroxyl-terminated compounds can be from 1.0 to 6.0, or from 1.8 to 4.0, or from 2.0 to 4.0. Average molecular weight of the hydroxyl-terminated compounds can be from 25 to 12,000 g/mol, or from 250 to 6,000 g/mol, or from 350 to 3,000 g/mol. In some embodiments, phosphate ester polyols can be made via reaction of hydroxyl-terminated compounds, phosphoric acid or polyphosphoric acid, and a polyisocyanate such as methyl diphenyl diisocyanate.

As discussed, suitable isocyanate-terminated prepolymers are the reaction products of a polyisocyanate and an isocyanate-reactive mixture at a stoichiometry ratio (NCO/OH) greater than 1, or between 2 and 6, or between 2.5 and 4.0. The polyisocyanate is selected from aromatic isocyanates, aliphatic isocyanates, and cycloaliphatic isocyanate. The isocyanate-reactive mixture comprises at least 1% of the phosphate ester polyols by weight of the isocyanate-reactive mixture, or from 2 to 25% of the phosphate ester polyols, or from 4 to 10% phosphate ester polyol by weight of the isocyanate-reactive mixture.

(B) Isocyanate-Reactive Component

In some embodiments, the isocyanate-reactive component comprises a hydroxyl-terminated compound. In some embodiments, the isocyanate-reactive component comprises a hydroxyl-terminated compound selected from the group consisting of a polyester polyol, a polycaprolactone polyol, a polyether polyol, a polycarbonate polyol, a natural oil-based polyol, and combinations thereof.

The average OH number for the hydroxyl-terminated compound can be from 5 to 2,000 mg KOH/gram, or from 14 to 850 mg KOH/gram, or from 56 to 500 mg KOH/gram, or from 110 to 450. The average functionality of the hydroxyl-terminated compound can be from 2.0 to 6.0, or from 2.0 to 4.0, or from 2.0 to 3.0. The average molecular weight of the hydroxyl-terminated compound can be from 25 to 12,000 g/mol, or from 250 to 6,000 g/mol, or from 350 to 3,000 g/mol. In addition, low molecular weight polyglycols, such as ethylene glycol, diethylene glycol, trimethylolpropane, dipropylene glycol, tripropylene glycol, and triisopropanolamine, can be included in the isocyanate-reactive component as well.

Lamination

It is contemplated that the isocyanate component and the polyol component of the disclosed solventless adhesive composition are formulated separately and stored until it is desired to form a laminate structure. Preferably, the isocyanate component and polyol component are in a liquid state at 25° C. Even if the components are solid at 25° C., it is acceptable to heat the components as necessary to put them into a liquid state. A laminate structure comprising the disclosed adhesive compositions can be formed according to various methods.

In some embodiments, the laminate structure can be formed by pre-mixing the isocyanate and isocyanate-reactive components before applying the mixed composition to a substrate. Such methods comprise mixing an isocyanate component and an isocyanate-reactive component at a stoichiometric ratio (NCO/OH) of from about 1.0 to about 5.0 to form a two-component adhesive composition, the isocyanate component comprising an isocyanate terminated prepolymer that is the reaction product of a polyisocyanate and an isocyanate-reactive mixture comprising a phosphate ester polyol. The methods further comprise applying the adhesive composition to a surface of a first substrate, bringing the surface of the first substrate into contact with a surface of a second substrate, and curing the adhesive composition to bond the first substrate to the second substrate.

In other embodiments, the laminate structure can be formed with relatively-newer laminating techniques (i.e., higher-reactivity systems in which each component is applied to a separate substrate before bringing the substrates together to mix the components). Such methods comprise uniformly applying an isocyanate component to a surface of a first substrate, the isocyanate component comprising an isocyanate terminated prepolymer that is the reaction product of a polyisocyanate and an isocyanate-reactive mixture comprising a phosphate ester polyol, uniformly applying an isocyanate-reactive component to a surface of a second substrate. Preferably, the thickness of the layer of the each component on the respective substrate is from 0.5 to 2.5 μm. By controlling the thickness of the layers applied to each substrate, the ratio of the components can be controlled. The methods further comprise bringing the first substrate and second substrate together, thereby mixing and reacting the isocyanate component and the polyol component to form an adhesive composition between the first substrate and the second substrate, and curing the adhesive composition to bond the first substrate and the second substrate. The isocyanate component and isocyanate-reactive component begin mixing and reacting when the first and second substrates are brought together and the components come into contact with each other. This marks the beginning of the curing process. Further mixing and reacting is accomplished as the first and second substrates are run through various other rollers and ultimately to a rewind roller. The further mixing and reacting occurs as the first and second substrates pass through rollers because the substrates each take longer or shorter paths than the other substrate across each roller. In this way, the two substrates move relative to one another, mixing the components on the respective substrates. The curable mixture is then cured or allowed to cure.

In some embodiments, a solvent, such as ethyl acetate, methyl ethyl ketone, toluene, and combinations thereof, can be incorporated in the disclosed two-component adhesive compositions to form solvent-based adhesives.

In some embodiments, an additive can optionally be included in the adhesive composition. Examples of such additives include, but are not limited to, a surfactant, a leveling agent, a defoamer, a rheology modifier, a color pigment, an adhesion promoter (e.g., phosphate esters and epoxies), and the like, and combinations thereof.

Suitable substrates in the laminate structure include films such as paper, woven and nonwoven fabric, polymer films, metal foil, and metal-coated (metallized) polymer films. Some films optionally have a surface on which an image is printed with ink which may be in contact with the adhesive composition. The substrates are layered to form a laminate structure, with an adhesive composition according to this disclosure adhering one or more of the substrates together.

Examples of the Disclosure

The present disclosure will now be explained in further detail by describing examples illustrating the disclosed adhesive compositions and existing adhesive compositions (Illustrative Examples "IE", Comparative Examples "CE", collectively, "the Examples"). However, the scope of the present disclosure is not, of course, limited to the Examples.

The Examples are prepared using the raw materials identified in Table 1.

TABLE 1

Raw Materials

| Component | General Description | Supplier |
|---|---|---|
| MOR-FREE ™ 88-138 | Hydroxyl-terminated component | The Dow Chemical Company |
| VORANOL ™ CP 1055 | Polyether triol | The Dow Chemical Company |
| VORANOL ™ CP 450 | Polyether triol | The Dow Chemical Company |
| VORANOL ™ CP 230-112 | Polyether triol | The Dow Chemical Company |
| VORANOL ™ CP 755 | Polyether triol | The Dow Chemical Company |
| ADCOTE ™ X111-43 | Polyester polyol | The Dow Chemical Company |
| MOR-FREE ™ 218 | Polyester polyol | The Dow Chemical Company |
| INTERMEDIATE 88 × 102 | Polyester polyol | The Dow Chemical Company |
| Polyphosphoric acid | Reagent grade 115% $H_3PO_4$ | Sigma Aldrich |
| 92 LBT | 24 micrometer thick polyethylene terephthalate | |
| Prelam AL | Pre-laminated film made from a polyethylene terephthalate (12 micrometer thick) laminated to soft lamination grade AMCOR ™ aluminum foil (9 μm thick) with ADCOTE ™ 550/Coreactant F | The Dow Chemical Company |
| GF-19 | Polyethylene sealant film containing high amount of slip additive | Berry Plastics |
| GF-10 | Polyethylene sealant film at 25 micrometer thickness | Berry Plastics |
| mPET | Metalized poly(ethylene glycol-terephthalate) film having thickness of 23 micrometer and a 0.02 micrometer aluminum layer on the PET side | FILMTech, Inc. |

Bond Strength Measurement

The 90° T-peel tests are performed on laminate samples cut to 15 mm wide strips and pulled on a Thwing Albert™ QC-3A peel tester equipped with a 50N loading cell at a rate of 4 inch/min on 1 inch strips. When the two films in the laminate separate (peel), the average of the force during the pull is recorded. If one of the films stretches or breaks, the maximum force or force at break is recorded. The values herein are the average of three separate sample strips. The failure mode (FM) or mode of failure (MOF) is recorded as follows: "FS" indicates film stretch; "FT" indicates film tear or break; "DL" indicates delamination (the secondary film separating from the primary film); "AT" indicates adhesive transfer (adhesive fails to adhere to the primary film and is transferred to the secondary film); "AS" indicates adhesive split or cohesive failure (adhesive is found on both primary and secondary film); "MT" indicates transfer of metal from metalized film to secondary film; "PMT" indicates partial metal transfer. The initial or "green" bonds are tested as soon as possible after the laminate are made. Additional T-peel tests are conducted at the time intervals indicated, usually after 1 day and 7 days.

Boil-in-Bag Test Procedure

Laminates are made from the Prelam Al and GF-19 or GF-10. One of the 9"×12" (23 cm×30.5 cm) sheets of laminate is folded over to give a double layer about 9"×6" (23 cm×15.25 cm) such that the PE film of one layer is in contact with the PE film of the other layer. The edges are trimmed on a paper cutter to give a folded piece about 5"×7" (12.7 cm×17.8 cm). Two long sides and one short side are heat sealed at the edges to give a finished pouch with an interior size of 4"×6" (10.2 cm×15.2 cm). The heat sealing is done at 177° C. (350° F.) for 1 second at a hydraulic pressure of 276 kpa (40 PSI). Two or three pouches are made for each test.

Pouches are filled through an open edge with 100±5 ml of 1:1:1 sauce (blend of equal parts by weight of ketchup, vinegar and vegetable oil). Splashing the filling onto the heat seal area is avoided as this could cause the heat seal to fail during the test. After filling, the top of the pouch is sealed in a manner that minimizes air entrapment inside of the pouch.

The seal integrity is inspected on all four sides of pouches to ensure that there are no flaws in the sealing that would cause the pouch to leak during the test. Any suspect pouches are discarded and replaced. In some cases, flaws in the laminate are marked to identify whether new additional flaws are generated during the testing.

A pot is filled two-thirds full of water and brought to a rolling boil. The boiling pot is covered with a lid to minimize water and steam loss. The pot is observed during the test to ensure that there is enough water present to maintain boiling. The pouch(es) are placed in the boiling water and kept there for 30 minutes. The pouches are removed and the extent of tunneling, blistering, de-lamination, or leakage is compared with any of the marked preexisting flaws. The observations are recorded. The pouches are cut open, emptied, and rinsed with soap and water. One or more 1" (2.54 cm) strips are cut from the pouches and the laminate bond strength is measured at 10 inch/min according to the standard bond strength test described earlier. This is done as soon as possible after removing the pouch contents. The interior of the pouches are examined and any other visual defects are recorded.

Chemical Aging Test Procedure

Laminates are made from the Prelam Al/GF-19 and 92 LBT/GF-19 described above. One of the 9"×12" (23 cm×30.5 cm) sheets of laminate is folded over to give a double layer about 9"×6 "(23 cm×15.25 cm) such that the PE film of one layer is in contact with the PE film of the other layer. The edges are trimmed on a paper cutter to give a folded piece about 5"×7" (12.7×17.8 cm). Two long sides and one short side are heat sealed at the edges to give a finished pouch with an interior size of 4"×6" (10.2 cm×15.2 cm). The heat sealing is done at 177° C. (350° F.) for 1 second at a hydraulic pressure of 276 kpa (40 PSI). Two or three pouches are made for each test.

Pouches are filled through the open edge with 100±5 ml of 1:1:1 sauce (blend of equal parts by weight of ketchup, vinegar and vegetable oil). Splashing the filling onto the heat seal area is avoided as this could cause the heat seal to fail during the test. After filling, the top of the pouch is sealed in a manner that minimizes air entrapment inside of the pouch.

The seal integrity is inspected on all four sides of pouches to ensure that there are no flaws in the sealing that would cause the pouch to leak during the test. Any suspect pouches are discarded and replaced. In some cases flaws in the laminate are marked to identify whether new additional flaws are generated during the testing.

The pouches containing the 1:1:1 sauce are than place in a convection oven set at 50° C. (122° F.) for 100 hours. The pouches are removed after aging and the extent of tunneling, blistering, de-lamination, or leakage is compared with any of the marked preexisting flaws.

The observations are recorded. The pouches are cut open, emptied, and rinsed with soap and water. One or more 1" (2.54 cm) strips are cut from the pouches and the laminate bond strength is measured according to the standard bond strength test described above. This is done as soon as possible after removing the pouch contents. The interior of the pouches are examined and any other visual defects are recorded.

Potlife Measurements

Potlife for the solvent free adhesive is determined by a Brookfield DY-II viscometer at given temperature. Potlife of an adhesive at a given temperature is defined as the time it takes for the adhesive to reach 4,000 cps at the temperature, and is measured on a Brookfield DY-II viscometer.

Potlife for the solvent-based adhesive is determined by measuring viscosity of the adhesive at room temperature using a #2 Zahn Cup. Potlife of an adhesive at the room temperature is defined as the time it takes for the adhesive to reach a viscosity when measured by #2 Zahn Cup, it would take more than 25 seconds for the liquid to completely drain from the cup.

Table 2 shows detailed compositions of selected Examples, broken down by isocyanate component and isocyanate-reactive component.

TABLE 2

| | Example Formulations (units) | | | | |
|---|---|---|---|---|---|
| | IE1 | IE2 | IE3 | CE1 | CE2 |
| Isocyanate Component (g) | | | | | |
| ISONATE ™ 125M | 129.23 | 61.30 | 63.88 | 129.23 | 62.96 |
| ISONATE ™ 143L | 264.04 | 13.91 | 13.91 | 264.04 | 14.00 |
| MOR-FREE ™ 218 | | 24.90 | 24.06 | | 30.81 |
| ADCOTE ™ x111-43 | | 46.66 | 45.12 | | 46.23 |
| Polyphosphoric Acid | 0.98 | 0.118 | 0.114 | | |
| VORANOL ™ CP 450 | 50.18 | | 5.91 | 51.16 | |

TABLE 2-continued

| Example Formulations (units) | | | | | |
|---|---|---|---|---|---|
| | IE1 | IE2 | IE3 | CE1 | CE2 |
| VORANOL ™ CP 750 | | 6.10 | | | |
| VORANOL ™ 230-112 | | | | | |
| VORANOL ™ 220-260 | 113.49 | | | 113.49 | |
| Ethyl Acetate | 98.07 | | | 98.07 | |
| NCO Content, %, measured by ASTM 2572-70 | 12.50 | 13.90 | 13.90 | 12.50 | 13.50 |
| Total Isocyanate Component | 656.0 | 153 | 153 | 656.0 | 154 |
| Isocyanate Reactive Component | | | | | |
| VORANOL ™CP 755 | | 100.0 | 100.0 | | 90.0 |
| MOR-FREE ™ 88-138 | | | | | 10.0 |
| ADCOTE ™ 86-116 | 984.00 | | | 984.00 | |
| Intermediate 88 × 102 | 518.24 | | | 518.24 | |
| Trimethylolpropane | 8.2 | | | 8.2 | |
| Phosphoric acid, 85% | 0.98 | | | 0.98 | |
| Ethyl acetate | 137.76 | | | 137.76 | |
| OH #, measured by ASTM D 4274-88 | 41.0 | 236.0 | 236.0 | 41.0 | 241.0 |
| Total Isocyanate Reactive Component | 1649.2 | 100.0 | 100.0 | 1649.2 | 100.0 |
| Potlife | >8 hours | 68 minutes | 60 minutes | >8 hours | 32 minutes |

In all examples, the stoichiometric ratio of the isocyanate component to the isocyanate-reactive component is maintained at 1.25.

Illustrative Example 1 ("IE1")

A lab glass reactor consisting of a 4-neck flask equipped with a mechanical stir and a temperature controller is used to produce the phosphate ester polyol. Under $N_2$ purge, 98.1 grams of VORANOL™ CP 450 is first loaded to the reactor. With agitation on, 1.9 grams of polyphosphoric acid is added to the reactor dropwise. After mixing at room temperature for 30 minutes, the reactor temperature is brought to 100° C. After 1 hour at 100° C., the reaction product is cooled down to room temperature for use in preparation of the isocyanate component.

Isocyanate Component: Into another lab glass reactor, 129.23 grams of ISONATE™ 125M premelted at 45° C. is first loaded. The temperature of the reactor is set to 50° C. With agitation on, 264.04 grams of ISONATE™ 143L is charged to the reactor. After mixing for 10 minutes, 51.16 grams of the phosphate ester polyol based on VORANOL™ CP 450 from step 1 is charged to the reactor. Cooling is applied if temperature exceeds 75° C. After reactor temperature is cooled down to between 50° C. to 60° C., 113.49 grams of VORANOL™ 220-260 is added to the reactor. The reaction is held at 75° C. for 2 more hours followed by addition of 98.07 grams of ethyl acetate. After mixing at 75° C. for 0.5 more hours, a clear, low viscosity prepolymer is obtained. The prepolymer is found to have a NCO content of 12.4%, and a solid content of 84%.

Isocyanate Reactive Component: A lab glass reactor consisting of a 4-neck flask equipped with a mechanical stir and a temperature controller is used to produce the isocyanate reactive component. The temperature of the reactor is set at 65° C. Under $N_2$ purge and with agitation on, 518.24 grams of Intermediate 88×102 is charged to the reactor, followed by the addition of 0.98 grams of phosphoric acid, 8.2 grams of TMP premelted at 65° C., 984.0 grams of ADCOTE™ 86-116, and 137.76 grams of ethyl acetate. Temperature of the reactor is then raised to 70° C. After mixing at 70° C. for 45 minutes, a clear, low viscosity liquid is obtained. The mixture is found to have a solid content 76.9%, an OH number of 41, and a room temperature viscosity of 890 cps.

Lamination: 1649.2 grams of Isocyanate Reactive Component, 656 grams of the Isocyanate Component, and 1346.5 grams ethyl acetate to obtain a 50% solids solution. The solution is then applied to Prelam Al at a coat weight of 1.7 lb/ream, and followed by laminating it with a high slip LLDPE film (GF-19) using a Nordmeccanica LABO COMBI™ pilot laminator. The same adhesive is applied to 92LBT at a coat weight of 1.781b/ream, and followed by laminating it with GF-19. Bond strength between the PE and the foil is measured immediately after the lamination and in intervals of 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 3.

Comparative Example 1 ("CE1")

Isocyanate Component: A lab glass reactor consisting of a 4-neck flask equipped with a mechanical stir and a temperature controller is used to produce the Isocyanate Component. 129.23 grams of ISONATE™ 125M premelted at 45° C. is first loaded. The temperature of the reactor is set to 50° C. With agitation on, 264.04 grams of ISONATE™ 143L is charged to the reactor. After mixing for 10 minutes, 51.16 grams of VORANOL™ CP 450 is charged to the reactor. Cooling is applied if temperature exceeds 75° C. After reactor temperature is cooled down to between 50° C. to 60° C., 113.49 grams of VORANOL™ 220-260 is added to the reactor. The reaction is held at 75° C. for 2 more hours followed by addition of 98.07 grams of ethyl acetate. After mixing at 75° C. for 0.5 more hours, a clear, low viscosity prepolymer is obtained. The prepolymer is found to have a NCO content of 12.5%, and a solid content of 84%.

Isocyanate Reactive Component: A lab glass reactor consisting of a 4-neck flask equipped with a mechanical stir and a temperature controller is used to produce the isocyanate reactive component. The temperature of the reactor is set at 65° C. Under $N_2$ purge and with agitation on, 518.24 grams of Intermediate 88×102 is charged to the reactor, followed by the addition of 0.98 grams of phosphoric acid, 8.2 grams of TMP premelted at 65° C., 984.0 grams of ADCOTE™ 86-116, and 137.76 grams of ethyl acetate. Temperature of the reactor is then raised to 70° C. After mixing at 70° C. for 45 minutes, a clear, low viscosity liquid is obtained. The mixture is found to have a solid content 76.9%, an OH number of 41, and a room temperature viscosity of 890 cps.

Lamination: 1649.2 grams of Isocyanate Reactive Component, 656 grams of the Isocyanate Component, and 1346.5 grams ethyl acetate to obtain a 50% solids solution. The solution is then applied to Prelam Al at a coat weight of 1.75 lb/ream, and followed by laminating it with a high slip LLDPE film (GF-19) using a Nordmeccanica LABO COMBI™ pilot laminator. The same adhesive is applied to 92LBT at a coat weight of 1.82 lb/ream, and followed by laminating it with GF-19. Bond strength between the PE and the foil is measured immediately after the lamination and in intervals of 1 day, 7 days, and 14 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 3.

Illustrative Example 2 ("IE2")

Isocyanate Component: 98.1 grams of VORANOL™ CP 755 is reacted with 1.9 grams of polyphosphoric acid to form a phosphate ester polyol as illustrated in IE1. The phosphate ester polyol is used to synthesize the Isocyanate Component.

Into a lab glass reactor consisting of a 4-neck flask equipped with a mechanical stir and a temperature controller, 61.30 grams of ISONATE™ 125M premelted at 45° C. is loaded. The temperature of the reactor is set to 50° C. With agitation on, 24.90 grams of MOR-FREE™ 218 is charged to the reactor, followed by addition of 46.66 grams of ADCOTE™ x111-43 and 6.22 grams of the phosphate ester polyol. Cooling is applied if temperature exceeds 75° C. After reacting at 80° C. for 4 hours, 13.91 grams ISONATE™ 143L is added to the reactor. After mixing for one more hour at 80° C., a clear, low viscosity prepolymer is obtained. The prepolymer is found to have a NCO content of 13.9%.

Lamination: 100 grams of VORANOL™ CP 755 is mixed with 153 grams of Isocyanate Component. The mixture is then applied to Prelam Al at a coat weight of 1.15 lb/ream, and followed by laminating it with a high slip LLDPE film (GF-19) using a Nordmeccanica Labocombi pilot laminator. The same adhesive is applied to 92LBT at a coat weight of 1.15 lb/ream, and followed by laminating it with GF-19. Bond strength between the PE and the foil is measured immediately after the lamination and in intervals of 4 hours, 1 day, and 7 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 3.

Illustrative Example 3 ("IE3")

Isocyanate Component: 98.1 grams of VORANOL™ CP 450 is reacted with 1.9 grams of polyphosphoric acid to form a phosphate ester polyol as illustrated in WE The phosphate ester polyol is used to synthesize the Isocyanate Component.

Into a lab glass reactor consisting of a 4-neck flask equipped with a mechanical stir and a temperature controller, 63.88 grams of ISONATE™ 125M premelted at 45° C. is loaded. The temperature of the reactor is set to 50° C. With agitation on, 24.06 grams of MOR-FREE™ 218 is charged to the reactor, followed by addition of 45.12 grams of ADCOTE™ x111-43 and 6.02 grams of the phosphate ester polyol. Cooling is applied if temperature exceeds 75° C. After reacting at 80° C. for 4 hours, 13.91 grams ISONATE™ 143L is added to the reactor. After mixing for one more hour at 80° C., a clear, low viscosity prepolymer is obtained. The prepolymer is found to have a NCO content of 13.9%.

Lamination: 100 grams of VORANOL™ CP 755 is mixed with 153 grams of Isocyanate. The mixture is then applied to Prelam Al at a coat weight of 1.10 lb/ream, and followed by laminating it with a high-slip LLDPE film (GF-19) using a Nordmeccanica LABO COMBI™ pilot laminator. The same adhesive is applied to 92LBT at a coat weight of 1.10 lb/ream, and followed by laminating it with GF-19. Bond strength between the PE and the foil is measured immediately after the lamination and in intervals of 4 hours, 1 day, and 7 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 3.

Comparative Example 2 ("CE2")

Isocyanate Component: Into a lab glass reactor consisting of a 4-neck flask equipped with a mechanical stir and a temperature controller, 62.96 grams of ISONATE™ 125M premelted at 45° C. is loaded. The temperature of the reactor is set to 50° C. With agitation on, 30.81 grams of MOR-1-'REE™ 218 is charged to the reactor, followed by addition of 46.23 grams of ADCOTE™ x111-43. Cooling is applied if temperature exceeds 75° C. After reacting at 80° C. for 4 hours, 14.00 grams ISONATE™ 143L is added to the reactor. After mixing for one more hour at 80° C., a clear, low viscosity prepolymer is obtained. The prepolymer is found to have a NCO content of 13.5%.

Lamination: 90 grams of VORANOL™ CP 755, 10 grams of MOR-FREE™ 88-138 is mixed with 153 grams of Isocyanate Component. The mixture is then applied to a prelaminted aluminum foil (Prelam Al) at a coat weight of 1.10 lb/ream, and followed by laminating it with a high-slip LLDPE film (GF-19) using a Nordmeccanica LABO COMBI™ pilot laminator. The same adhesive is applied to 92LBT at a coat weight of 1.10 lb/ream, and followed by laminating it with GF-19. Bond strength between the PE and the foil is measured immediately after the lamination and in intervals of 4 hours, 1 day, and 7 days after the lamination. After 7 days, pouches are made using the laminate structure and filled with a 1:1:1 sauce (blend of equal parts by weight of ketchup, vinegar and vegetable oil) for boil-in-bag and heat aging tests. Results on bond strength and failure mode are summarized in Table 3.

TABLE 3

| Performance Results | | | | | | | | | | |
|---|---|---|---|---|---|---|---|---|---|---|
| | IE1 | | IE2 | | IE3 | | CE1 | | CE2 | |
| | Prelam AL/GF-19 | 92LBT/ GF-19 | Prelam AL/GF-19 | 92LBT/ GF-19 | Prelam AL/GF-19 | 92LBT/ GF-19 | Prelam AL/GF-19 | 92LBT/ GF-19 | Prelam AL/GF-19 | 92LBT/ GF-19 |
| Green Bond, g/inch | 225 ± 1.5 (AS) | 271 ± 7.6 (AS) | | | | | 324 ± 17 (AS) | 323 ± 53 (AS) | | |
| 4 hour bond, g/inch | | | 393 ± 7 (AS) | 486 ± 10 (AS) | 448 ± 3 (AS) | 659 ± 12 (AS) | | | 354 ± 19 (AS) | 479 ± 20 (AS) |
| 1 day, g/inch | 2280 ± 16 (FT) | 2484 ± 70 (FT) | 589 ± 32 (AT) | 933 ± 88 (FS) | 526 ± 26 (AT) | 1253 ± 48 (FT) | 1129 ± 360 (FT) | 1166 ± 128 (AS) | 1090 ± 27 (FT) | 1175 ± 27 (FT) |
| 7 day, g/inch | 2300 ± 212 (FT) | 2425 ± 38 (FT) | 732 ± 79 (AT) | 1111 ± 54 (FT) | 638 ± 39 (AT) | 1292 ± 45 (FT) | 979 ± 276 (FT) | 1081 ± 124 (FT) | 976 ± 49 (AT) | 506 ± 42 (AT) |
| Boil-in-bag, g/inch | 827 ± 17 (AS) | 272 ± 88 (AS) | 546 ± 26 (AS) | 402 ± 19 (AS) | 772 ± 30 (FS) | 417 ± 18 (AS) | Delaminated | 227 ± 18 (AS) | 586 ± 24 (AS) | 355 ± 21 (AT) |
| Aging, g/inch | 394 ± 49 (AS) | 449 ± 33 (AS) | | | | | Delaminated | 97 ± 11 (AS) | Delaminated | 373 ± 48 (AT) |

For solvent-based adhesives, IE1 demonstrated significantly improved bond strength and improved chemical and temperature resistance compared to the CE1. For solventless adhesives, while IE2 and IE3 have much longer potlife (double the potlife of CE2), the Illustrative Examples demonstrated similar bond buildup compared to CE2 that is based on an isocyanate-reactive component containing phosphate ester polyol. In addition, IE2 and IE3 also demonstrated similar or better bond strength as well as chemical and temperature resistance.

In addition to the embodiments described above, many embodiments of specific combinations are within the scope of the disclosure, some of which are described below:

Embodiment 1. A two-component adhesive composition, comprising:

(A) an isocyanate component comprising an isocyanate-terminated prepolymer that is the reaction product of:
  a polyisocyanate; and
  an isocyanate-reactive mixture comprising a phosphate ester polyol; and (B) an isocyanate-reactive component comprising a polyol.

Embodiment 2. The two-component adhesive composition of any preceding or succeeding Embodiment, wherein the polyisocyanate is selected from the group consisting of an aromatic isocyanate, an aliphatic isocyanate, a cycloaliphatic isocyanate, and combinations thereof.

Embodiment 3. The two-component adhesive composition of any preceding or succeeding Embodiment, wherein the phosphate ester polyol is the reaction product of a hydroxy-terminated compound and a (poly)phosphoric acid.

Embodiment 4. The two-component adhesive composition of any preceding or succeeding Embodiment, wherein the phosphate ester polyol is the reaction product of a hydroxy-terminated compound, a (poly)phosphoric acid, and another polyisocyanate.

Embodiment 5. The two-component adhesive composition of Embodiment 3, wherein the hydroxy-terminated compound is selected from the group consisting of a polyester polyol, a polycaprolactone polyol, a polyether polyol, a polycarbonate polyol, a natural oil-based polyol, and combinations and copolymers thereof.

Embodiment 6. The two-component adhesive composition of Embodiment 3, wherein the hydroxy-terminated compound has an average OH number of from 5 to 2,000 mg KOH/gram.

Embodiment 7. The two-component adhesive composition of Embodiment 3, wherein the hydroxy-terminated compound has an average OH number of from 14 to 850 mg KOH/gram.

Embodiment 8. The two-component adhesive composition of Embodiment 3, wherein the hydroxy-terminated compound has an average OH number of from 56 to 500 mg KOH/gram.

Embodiment 9. The two-component adhesive composition of Embodiment 3, wherein the hydroxy-terminated compound has an average functionality of from 1.0 to 6.0.

Embodiment 10. The two-component adhesive composition of Embodiment 3, wherein the hydroxy-terminated compound has an average functionality of from 1.8 to 4.0.

Embodiment 11. The two-component adhesive composition of Embodiment 3, wherein the hydroxy-terminated compound has an average functionality of from 2.0 to 4.0.

Embodiment 12. The two-component adhesive composition of Embodiment 3, wherein the hydroxy-terminated compound has an average molecular weight of from 25 to 12,000 g/mol.

Embodiment 13. The two-component adhesive composition of Embodiment 3, wherein the hydroxy-terminated compound has an average molecular weight of from 250 to 6,000 g/mol.

Embodiment 14. The two-component adhesive composition of Embodiment 3, wherein the hydroxy-terminated compound has an average molecular weight of from 350 to 3,000 g/mol.

Embodiment 15. The two-component adhesive composition of any preceding or succeeding Embodiment, wherein the phosphate ester polyol accounts for at least −1 weight percent of the total weight of the isocyanate-reactive mixture.

Embodiment 16. The two-component adhesive composition of any preceding or succeeding Embodiment, wherein the phosphate ester polyol accounts for from 2 to 25 weight percent of the total weight of the isocyanate-reactive mixture.

Embodiment 17. The two-component adhesive composition of any preceding or succeeding Embodiment, wherein the phosphate ester polyol accounts for from 4 to 10 weight percent of the total weight of the isocyanate-reactive mixture.

Embodiment 18. The two-component adhesive composition of any preceding or succeeding Embodiment, wherein the polyisocyanate and the isocyanate-reactive mixture are present at a stoichiometric ratio (NCO/OH) of at least 1.

Embodiment 19. The two-component adhesive composition of any preceding or succeeding Embodiment, wherein the polyisocyanate and the isocyanate-reactive mixture are present at a stoichiometric ratio (NCO/OH) of from 2.0 to 6.0.

Embodiment 20. The two-component adhesive composition of any preceding or succeeding Embodiment, wherein the polyisocyanate and the isocyanate-reactive mixture are present at a stoichiometric ratio (NCO/OH) of from 2.5 to 4.0.

Embodiment 21. The two-component adhesive composition of any preceding or succeeding Embodiment, wherein the polyol of the isocyanate-reactive component is selected from the group consisting of a polyester polyol, a polycaprolactone polyol, a polyether polyol, a polycarbonate polyol, a natural oil-based polyol, and combinations thereof.

Embodiment 22. The two-component adhesive composition of any preceding or succeeding Embodiment, further comprising a solvent selected from the group consisting of ethyl acetate, methyl ethyl ketone, toluene, and combinations thereof.

Embodiment 23. The two-component adhesive composition of any preceding or succeeding Embodiment, further comprising an additive selected from the group consisting of a surfactant, a leveling agent, a defoamer, a rheology modifier, a color pigment, an adhesion promoter (e.g., phosphate esters and epoxies), and combinations of two or more thereof.

Embodiment 24. A method for preparing a two-component adhesive formulation, comprising:

preparing an isocyanate component comprising an isocyanate-terminated prepolymer by reacting a polyisocyanate with an isocyanate-reactive mixture comprising a phosphate ester polyol;

preparing an isocyanate-reactive component comprising a polyol;

mixing the isocyanate component and the isocyanate-reactive component at a stoichiometric ratio (NCO/OH) of from about 1.0 to about 5.0.

Embodiment 25. A method for forming a laminate structure, comprising:

mixing an isocyanate component and an isocyanate-reactive component at a stoichiometric ratio (NCO/OH) of from about 1.0 to about 5.0 to form a two-component adhesive composition, the isocyanate component comprising an isocyanate-terminated prepolymer that is the reaction product of a polyisocyanate and an isocyanate-reactive mixture comprising a phosphate ester polyol;

applying the adhesive composition to a surface of a first substrate;

bringing the surface of the first substrate into contact with a surface of a second substrate; and curing the adhesive composition to bond the first substrate to the second substrate.

Embodiment 26. A method for forming a laminate structure, comprising:

uniformly applying an isocyanate component to a surface of a first substrate, the isocyanate component comprising an isocyanate-terminated prepolymer that is the reaction product of a polyisocyanate and an isocyanate-reactive mixture comprising a phosphate ester polyol;

uniformly applying an isocyanate-reactive component to a surface of a second substrate;

bringing the first substrate and second substrate together, thereby mixing and reacting the isocyanate component and the polyol component to form an adhesive composition between the first substrate and the second substrate; and curing the adhesive composition to bond the first substrate and the second substrate.

Embodiment 27. A laminate structure comprising the two-component adhesive composition according to any preceding or succeeding Embodiment.

What is claimed is:

1. A two-component adhesive composition, comprising:

(A) an isocyanate component comprising an isocyanate-terminated prepolymer that is the reaction product of:
  a polyisocyanate; and
  an isocyanate-reactive mixture comprising a phosphate ester polyol that is the reaction product of:
    a hydroxy-terminated compound,
    a polyphosphoric acid, and
    another polyisocyanate; and (B) an isocyanate-reactive component comprising a polyol.

2. The two-component adhesive composition of claim 1, wherein the phosphate ester polyol accounts for at least 1 weight percent of the total weight of the isocyanate-reactive mixture.

3. The two-component adhesive composition of claim 1, wherein the polyisocyanate and the isocyanate-reactive mixture are present at a stoichiometric ratio (NCO/OH) of at least 1.

4. The two-component adhesive composition of claim 1, wherein the polyisocyanate and the isocyanate-reactive mixture are present at a stoichiometric ratio (NCO/OH) of from 2.0 to 6.0.

5. The two-component adhesive composition of claim 1, further comprising a solvent selected from the group consisting of ethyl acetate, methyl ethyl ketone, toluene, and combinations thereof.

6. The two-component adhesive composition of claim 1, further comprising an additive selected from the group consisting of a surfactant, a leveling agent, a defoamer, a rheology modifier, a color pigment, an adhesion promoter, and combinations of two or more thereof.

7. A laminate structure comprising the two-component adhesive composition according to claim 1.

* * * * *